(12) United States Patent
Park et al.

(10) Patent No.: US 11,342,629 B2
(45) Date of Patent: May 24, 2022

(54) METHOD FOR MANUFACTURING BATTERY MODULE

(71) Applicant: LG Chem, Ltd., Seoul (KR)

(72) Inventors: Eun Suk Park, Daejeon (KR); Se Woo Yang, Daejeon (KR); Yoon Gyung Cho, Daejeon (KR); Yang Gu Kang, Daejeon (KR); Hyun Suk Kim, Daejeon (KR); Hyoung Sook Park, Daejeon (KR); Sang Min Park, Daejeon (KR); Young Jo Yang, Daejeon (KR)

(73) Assignee: LG Chem, Ltd.

( * ) Notice: Subject to any disclaimer, the term of this patent is extended or adjusted under 35 U.S.C. 154(b) by 21 days.

(21) Appl. No.: 16/753,084

(22) PCT Filed: Nov. 5, 2018

(86) PCT No.: PCT/KR2018/013295
§ 371 (c)(1),
(2) Date: Apr. 2, 2020

(87) PCT Pub. No.: WO2019/117462
PCT Pub. Date: Jun. 20, 2019

(65) Prior Publication Data
US 2020/0321565 A1    Oct. 8, 2020

(30) Foreign Application Priority Data

Dec. 14, 2017  (KR) .......................... 10-2017-0172480

(51) Int. Cl.
*B29C 65/00* (2006.01)
*H01M 50/258* (2021.01)
(Continued)

(52) U.S. Cl.
CPC ........... *H01M 50/258* (2021.01); *B29C 65/50* (2013.01); *H01M 50/116* (2021.01)

(58) Field of Classification Search
CPC ............................ B29C 65/50; H10M 50/258
See application file for complete search history.

(56) References Cited

U.S. PATENT DOCUMENTS 4,599,535 A * 7/1986 Toch ........................ H01J 9/244
                                                                  313/478
2001/0007730 A1    7/2001 Yamamoto et al.
(Continued)

FOREIGN PATENT DOCUMENTS

| CN | 1305642 A | 7/2001 |
| CN | 101933177 A | 12/2010 |

(Continued)

OTHER PUBLICATIONS

Specification translation of KR 2016/0051444A (Year: 2016).*
(Continued)

*Primary Examiner* — Philip C Tucker
*Assistant Examiner* — Nickolas R Harm
(74) *Attorney, Agent, or Firm* — Lerner, David, Littenberg, Krumholz & Mentlik, LLP

(57) ABSTRACT

A method for manufacturing a battery module is disclosed herein. In some embodiments, a method for manufacturing a battery module which comprises a module case, in which an internal space is formed by a bottom plate and sidewalls, and an injection port is formed in the bottom plate or the sidewalls; a plurality of battery cells existing in the internal space; and a resin layer in contact with the bottom plate or the sidewalls while being in contact with the battery cells, the method including attaching a tape to cover the injection port of the bottom plate or the sidewalls; mounting an injection device of a resin composition such that the injec-
(Continued)

tion device is mounted on the injection port while penetrating the tape, and injecting the resin composition into the mounted injection device. The method provides a simple process and at low cost without occurrence of a reverse discharge phenomenon.

11 Claims, 9 Drawing Sheets

(51) Int. Cl.
    *B29C 65/50*     (2006.01)
    *H01M 50/116*     (2021.01)

(56) References Cited

U.S. PATENT DOCUMENTS

| | | | |
|---|---|---|---|
| 2007/0170557 A1* | 7/2007 | Shimizu | B29C 33/30 257/668 |
| 2007/0224491 A1* | 9/2007 | Woo | H01M 50/636 429/72 |
| 2008/0305006 A1* | 12/2008 | Cho | B01L 3/50273 422/68.1 |
| 2010/0216016 A1* | 8/2010 | Seino | H01M 50/172 429/185 |
| 2011/0027645 A1 | 2/2011 | Komatsuki et al. | |
| 2011/0250475 A1* | 10/2011 | Yamamoto | H01M 50/116 429/7 |
| 2012/0007261 A1* | 1/2012 | Hoshi | B29C 39/24 264/1.1 |
| 2012/0183819 A1* | 7/2012 | Yamamoto | H01M 50/116 429/61 |
| 2016/0149175 A1 | 5/2016 | Morimitsu et al. | |
| 2018/0076493 A1 | 3/2018 | Park et al. | |
| 2018/0233711 A1* | 8/2018 | Kato | H01M 10/0585 |

FOREIGN PATENT DOCUMENTS

| | | |
|---|---|---|
| CN | 102044715 A | 5/2011 |
| CN | 102333628 A | 1/2012 |
| CN | 203895535 U | 10/2014 |
| CN | 204809307 U | 11/2015 |
| CN | 107431147 A | 12/2017 |
| JP | 2011113722 A | 6/2011 |
| JP | 2016197572 A | 11/2016 |
| JP | 20160207494 A | 12/2016 |
| JP | 6137140 B2 | 5/2017 |
| KR | 20100098458 A | 9/2010 |
| KR | 20160051444 A | 5/2016 |
| KR | 20160105354 A | 9/2016 |

OTHER PUBLICATIONS

International Search Report for Application No. PCT/KR2018/013295 dated Feb. 12, 2019, 2 pages.

Search Report dated Dec. 10, 2021 from Office Action for Chinese Application No. 201880065623.3 dated Dec. 22, 2021. 3 pgs.

* cited by examiner

[Figure 1]
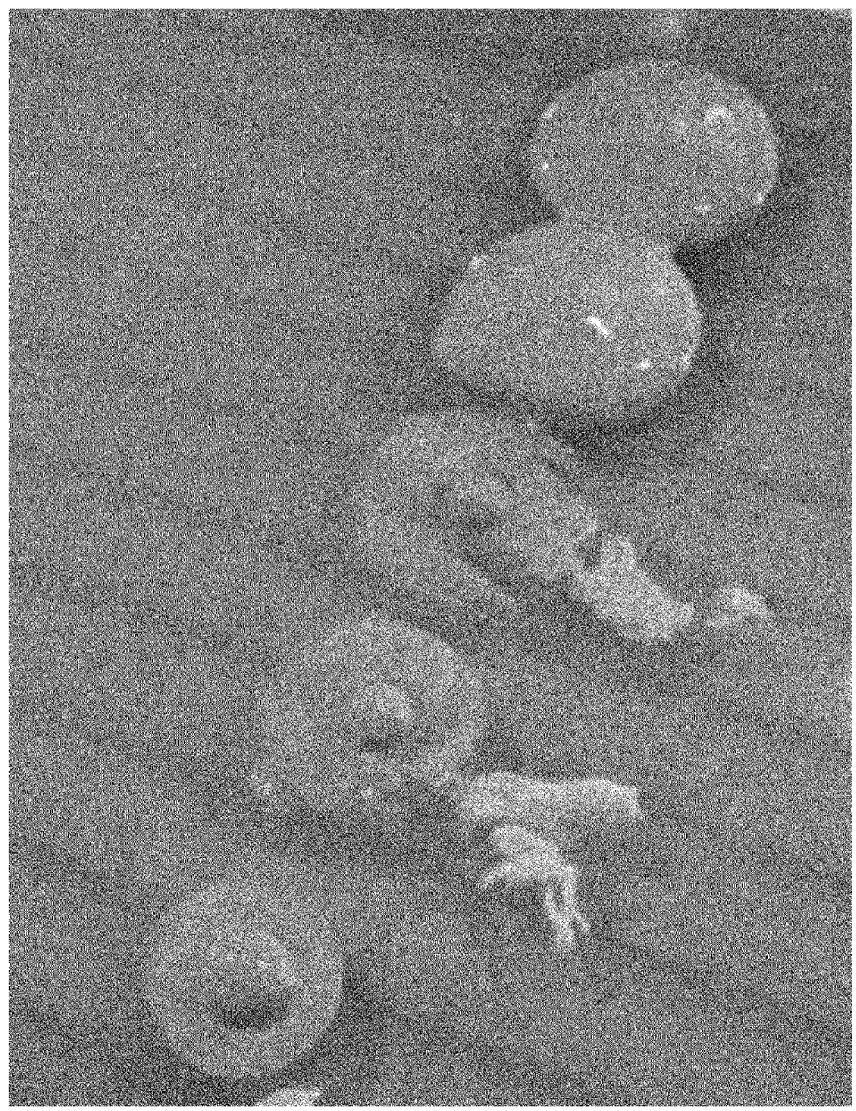

[Figure 2]
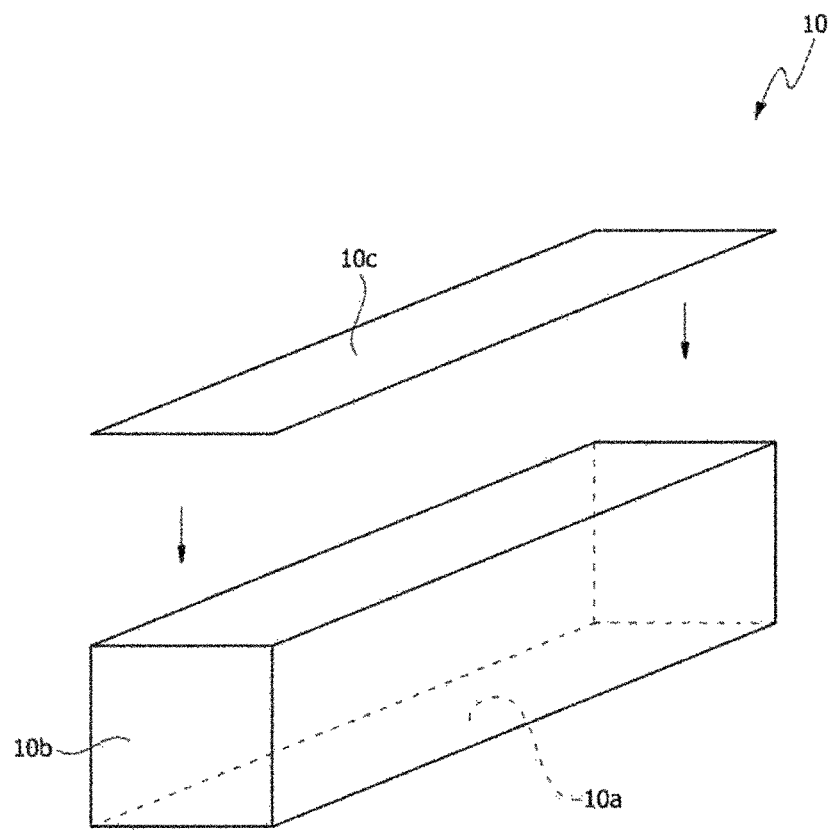

[Figure 3]
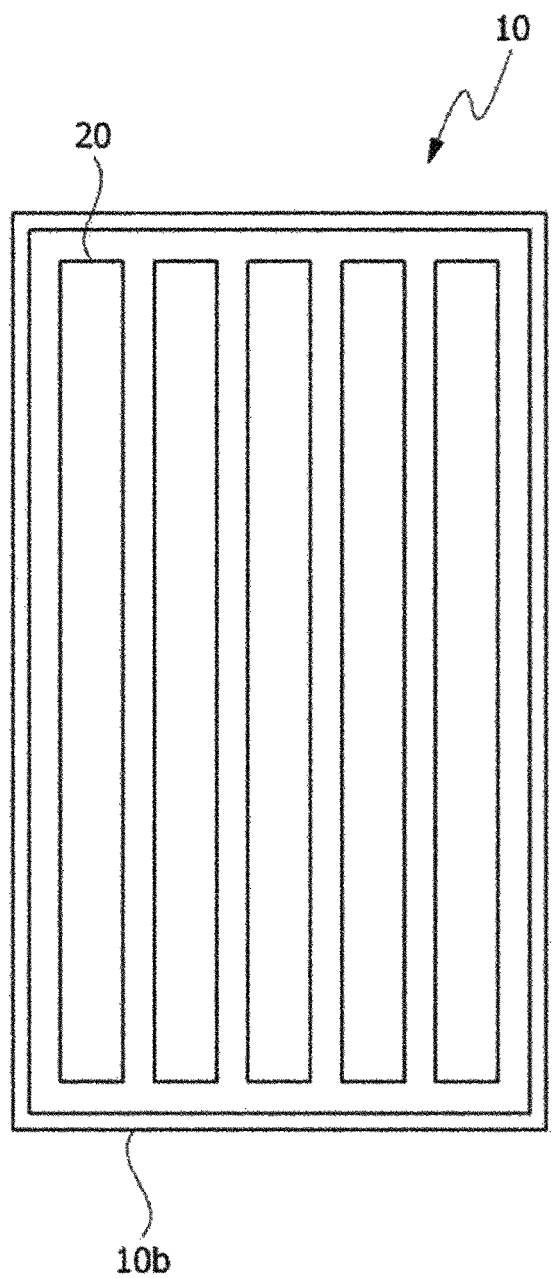

[Figure 4]
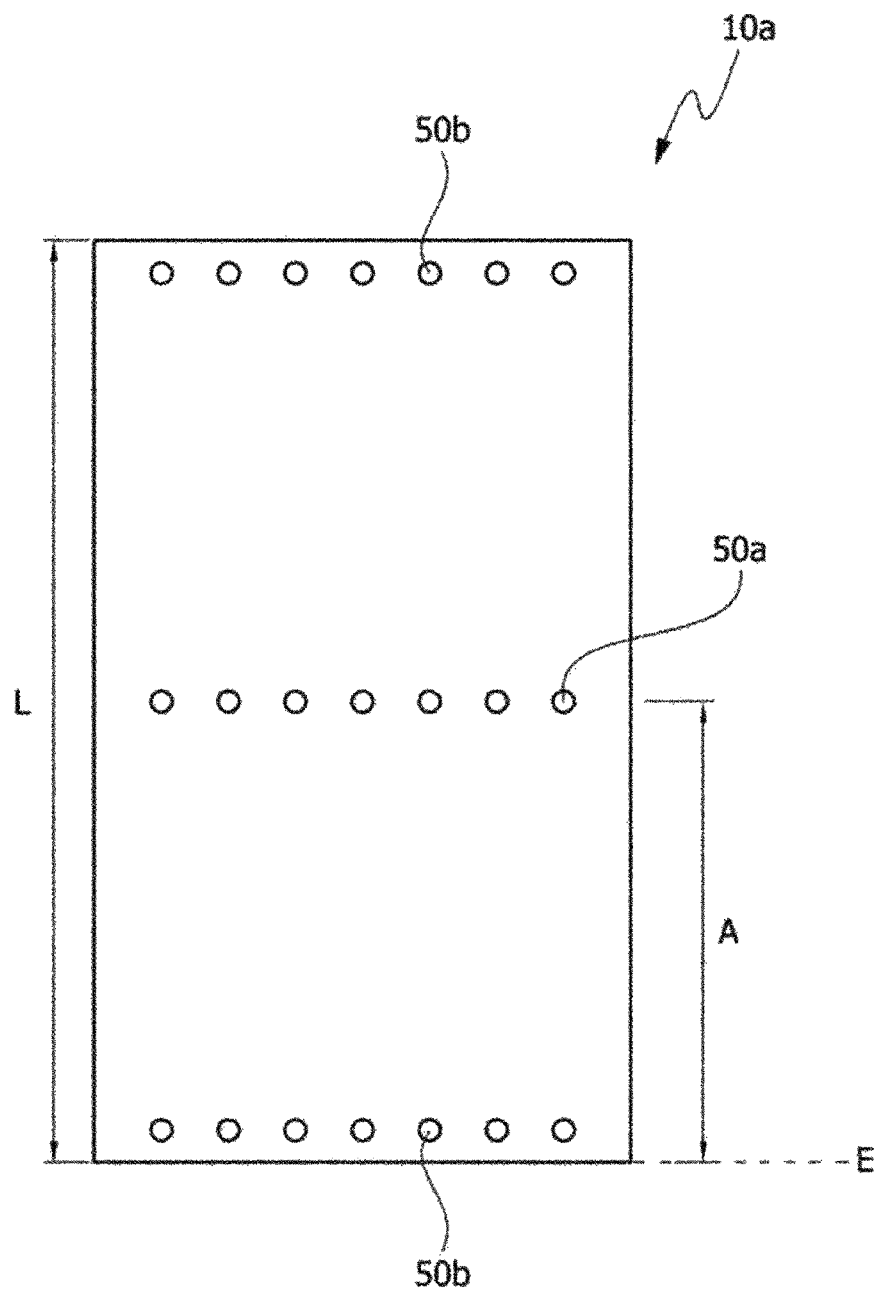

[Figure 5]
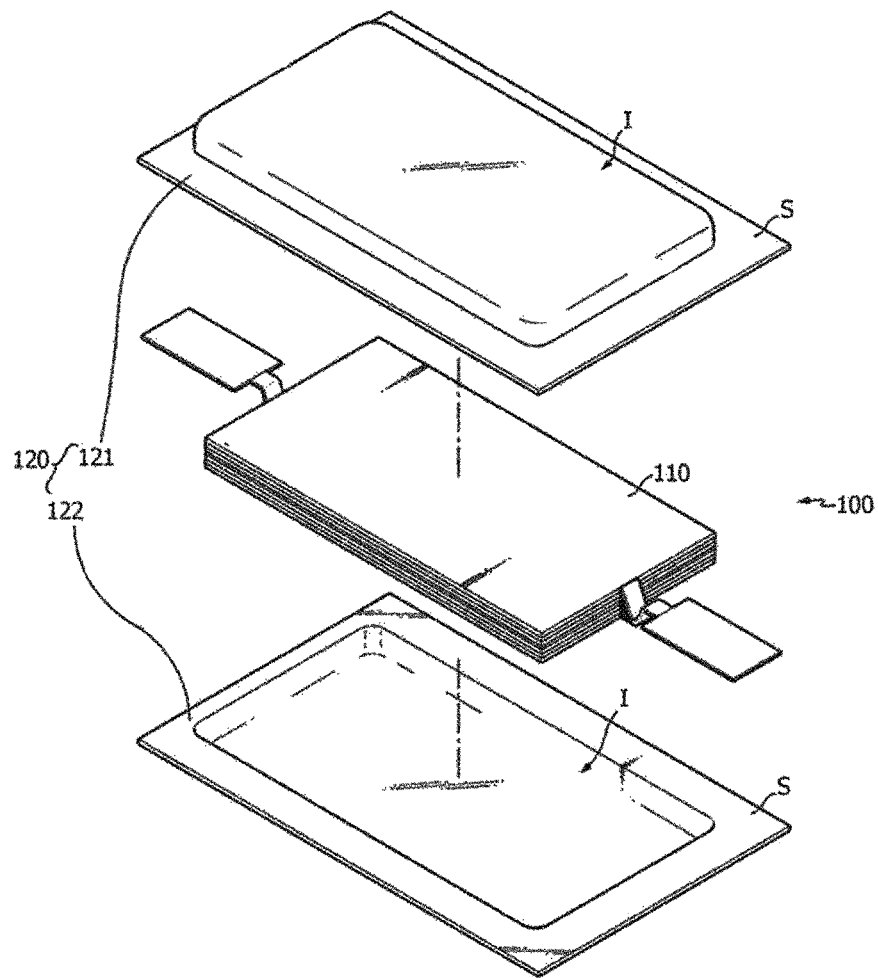

[Figure 6]
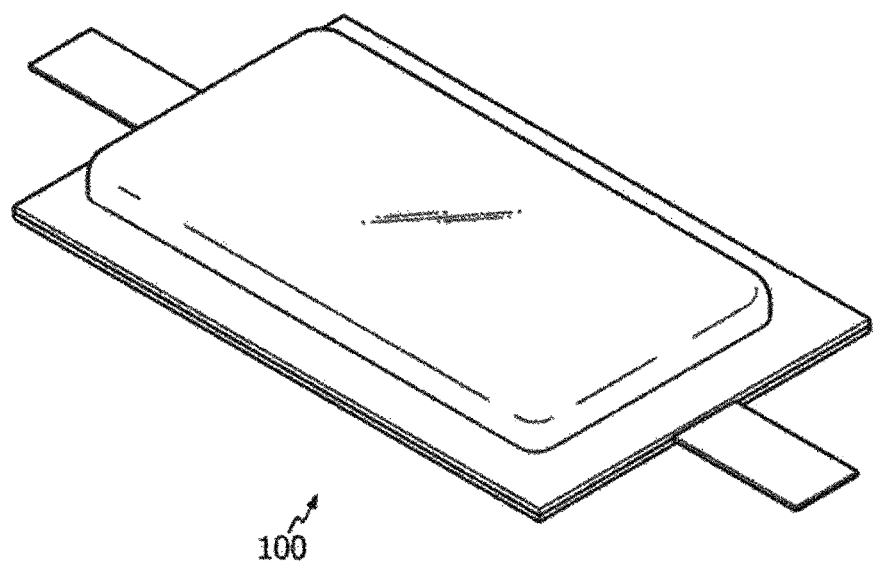

[Figure 7]
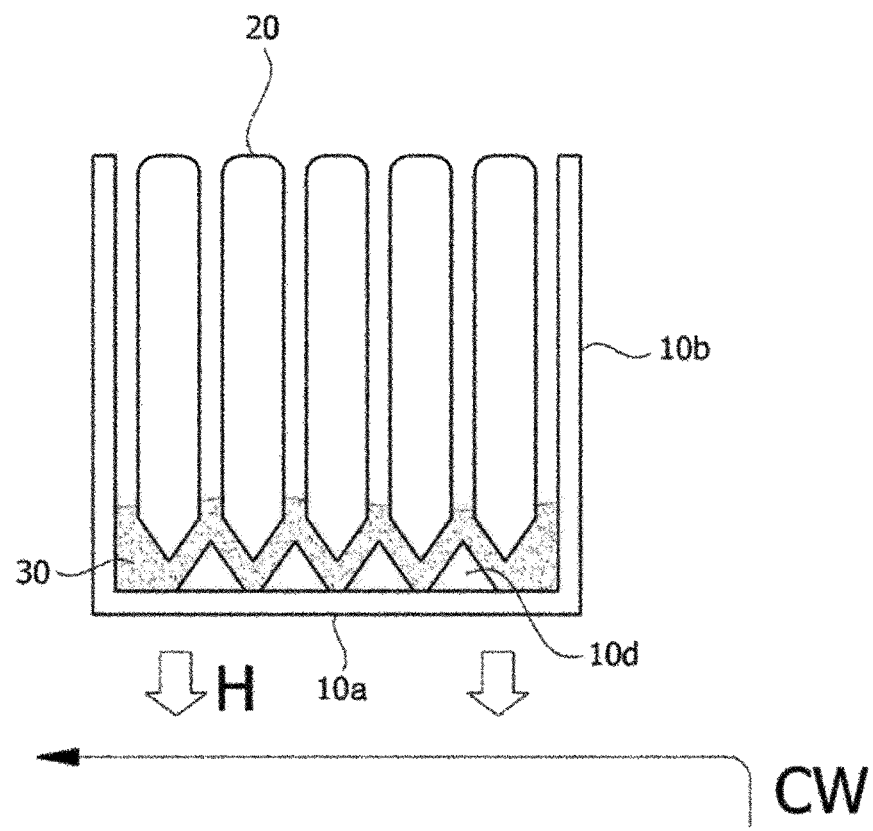

[Figure 8]
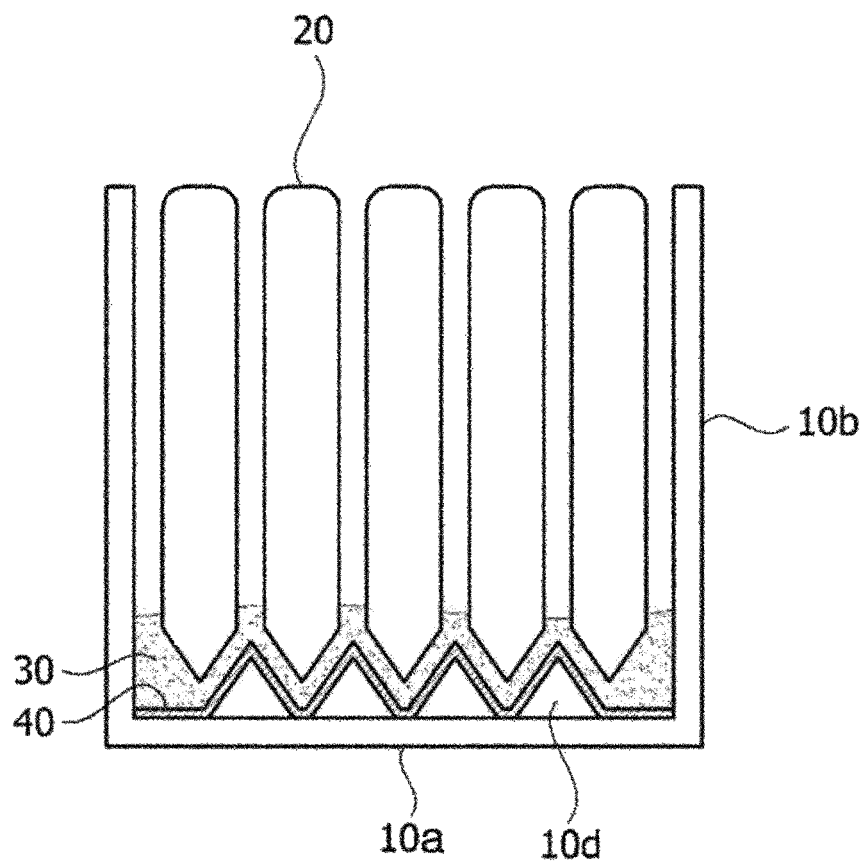
[Figure 9]
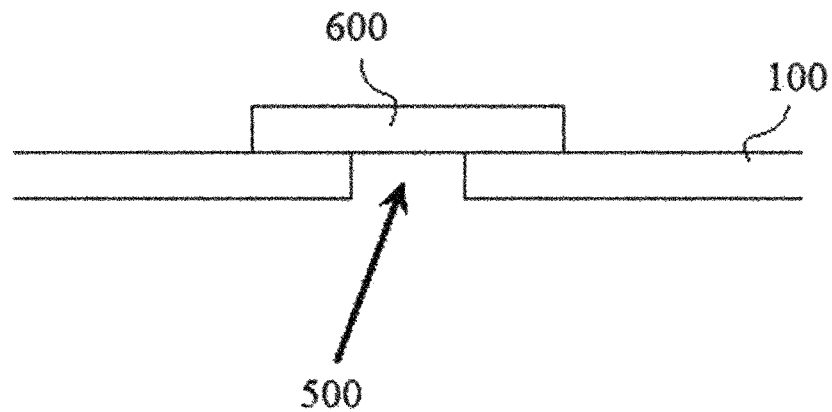

[Figure 10]
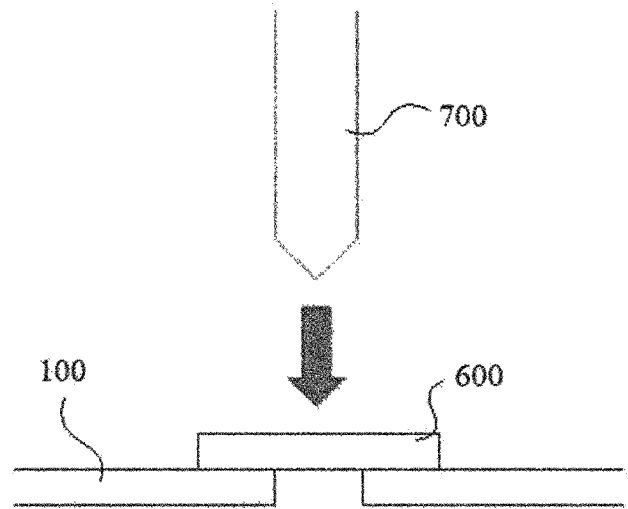
[Figure 11]
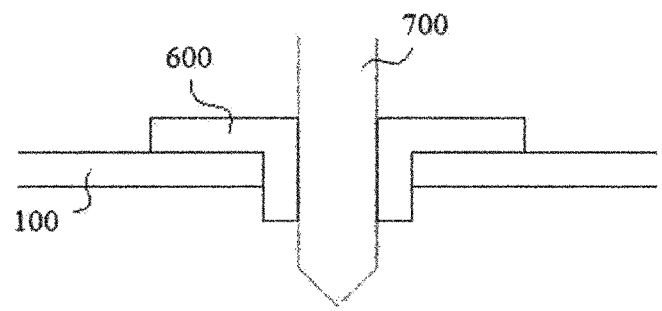
[Figure 12]
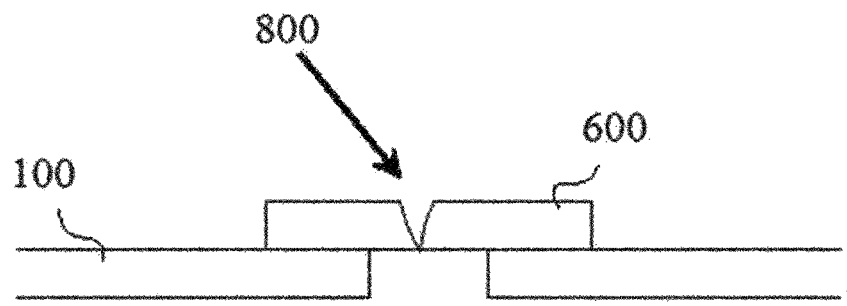

METHOD FOR MANUFACTURING BATTERY MODULE

Cross-reference to related application(s) The present application is a national phase entry under 35 U.S.C. § 371 of International Application No. PCT/KR2018/013295, filed on Nov. 5, 2018, which claims priority from Korean Patent Application No. 10-2017-0172480, filed on Dec. 14, 2017, the disclosures of which are incorporated by reference herein.

TECHNICAL FIELD

The present application relates to a method for manufacturing a battery module.

BACKGROUND ART

The secondary battery includes a nickel cadmium battery, a nickel hydride battery, a nickel zinc battery, or a lithium secondary battery, and the like, where a typical example thereof is a lithium secondary battery.

The lithium secondary battery mainly uses lithium oxides and carbon materials as positive electrode and negative electrode active materials, respectively. The lithium secondary battery includes an electrode assembly in which a positive plate and a negative plate coated with a positive electrode active material and a negative electrode active material, respectively, are disposed with a separator interposed therebetween, and an exterior material in which the electrode assembly is sealed and housed together with an electrolyte, which can be classified as a can type secondary battery and a pouch type secondary battery depending on the kind of the exterior material.

In this specification, a single secondary battery can be referred to as a battery cell.

When used in medium and large devices such as automobiles or energy storage systems, to increase capacity and power, a large number of battery cells may be electrically connected to each other to constitute a battery module or a battery pack.

For example, Patent Document 1 discloses a battery module having excellent power relative to the volume while being lightweight, and having excellent heat dissipation characteristics.

The battery module disclosed in Patent Document 1 comprises battery cells housed in a case, where a resin layer exists between the battery cells and the case. This resin layer is formed by injecting a curable resin composition through the injection port formed in the case and then curing it in the manufacturing processes.

However, in the course of injecting the curable resin composition, the internal pressure in the case rises, but while the increased internal pressure is relieved after the injection process, a phenomenon occurs, in which the injected curable resin composition is discharged out of the injection port again (see FIG. 1). The curable resin thus reversely discharged needs to be removed by a separate process.

BRIEF DESCRIPTION OF DRAWINGS

FIG. 1 is a photograph showing a reverse discharge phenomenon.
FIG. 2 is a diagram showing an exemplary module case.
FIG. 3 is a diagram showing a form in which battery cells are housed in a module case.
FIG. 4 is a diagram of an exemplary bottom plate in which injection ports and observation holes are formed.
FIGS. 5 and 6 are diagrams showing an exemplary battery pouch that may be used as a battery cell.
FIGS. 7 and 8 are diagrams showing the structure of an exemplary battery module.
FIG. 9 is a schematic diagram in the form that a tape is attached so as to cover an injection port.
FIG. 10 is a schematic diagram of a process of mounting an injection device to an injection port, and FIG. 11 is a diagram showing an injection device mounted on an injection port.
FIG. 12 is a schematic diagram of a case where a penetrating auxiliary portion is formed on a tape.

DISCLOSURE

Technical Problem

The present application provides a method for manufacturing a battery module. It is an object of the present application to provide a manufacturing method capable of solving a process delay or contamination of a case and the like due to a reverse discharge phenomenon that occurs when a curable resin composition is injected into an injection port.

Technical Solution

Among physical properties mentioned in this specification, when the measured temperature affects the result, the relevant physical property is a physical property measured at room temperature, unless otherwise specified. The term room temperature is a natural temperature without warming or cooling, and usually a temperature in a range of about 10° C. to about 30° C., or about 23° C. or about 25° C. or so. In addition, unless otherwise specified herein, the unit of temperature is ° C.

Among physical properties mentioned in this specification, when the measured pressure affects the result, the relevant physical property is a property measured at normal pressure, unless otherwise specified. The term normal pressure is a natural pressure without being pressurized or depressurized, and usually about 1 atm or so is referred to as normal pressure.

Hereinafter, first, the structure of the battery module manufactured by the manufacturing method of the present application will be described.

The battery module manufactured in the present application comprises a module case and a battery cell, where the battery cell is housed in the module case. One or more battery cells may be present in the module case, and a plurality of battery cells may be housed in the module case. The number of battery cells housed in the module case is adjusted depending on applications and the like, which is not particularly limited. The battery cells housed in the module case may be electrically connected to each other.

The module case may comprise at least sidewalls and a bottom plate which form an internal space in which the battery cell can be housed. The module case may further comprise a top plate for sealing the internal space. The sidewalls, the bottom plate, and the top plate are integrally formed with each other, or the sidewalls, the bottom plate, and/or the top plate as separated from each other are assembled, so that the module case can be formed. The shape and size of such a module case are not particularly limited and may be appropriately selected depending on applications, and the type and number of the battery cell housed in the internal space, and the like.

In this specification, since there are at least two plates constituting the module case excluding sidewalls, the term top plate and bottom plate are terms having relative concepts used to distinguish them. That is, it does not mean that in the actual use state, the top plate necessarily exists at the upper portion and the bottom plate necessarily exists at the lower portion.

FIG. 2 is a view showing an exemplary module case (10), which is an example of a box-shaped case (10) comprising one bottom plate (10a) and four sidewalls (10b). As in FIG. 2, the module case (10) may further comprise a top plate (10c) sealing the internal space.

FIG. 3 is a schematic view of the module case (10) of FIG. 2, as observed from above, in which the battery cells (20) are housed.

An injection port is formed in the bottom plate, the sidewalls, and/or the top plate of the module case. Such an injection port may be formed on the bottom plate or the like which is in contact with a resin layer to be described below, and may be formed on the top plate and the bottom plate, and the like which are in contact with the resin layer. The injection port is formed for a process of injecting a resin composition forming the resin layer, as described below. The shape, number and position of the injection port can be adjusted in consideration of the injection efficiency of the resin composition. In one example, the injection port may be formed at least on the bottom plate and the top plate.

In one example, the injection port may be formed at about 1/4 to 3/4 point or about 3/8 to 7/8 point, or approximately the middle, of the total length of the sidewalls, the bottom plate, or the top plate. By injecting the resin composition through the injection port formed at this point, the resin layer can be injected so as to have a wide contact area. Here, as shown in FIG. 4, 1/4, 3/4, 3/8, or 7/8 point is, for example, a ratio of the distance (A) to the hole forming position relative to the total length (L) measured based on any one end face (E) of the bottom plate or the like. The end (E) at which the length (L) and the distance (A) are formed may be any end (E) as long as the length (L) and the distance (A) are measured from the same end (E). In FIG. 4, the injection port (50a) is in a form of being located at the approximately middle part of the bottom plate (10a).

The size and shape of the injection port are not particularly limited, and can be formed in consideration of the injection efficiency of a resin layer material to be described below. For example, the injection port may have a circular shape, an elliptical shape, a polygonal shape such as triangle or square, or an amorphous shape. The number and spacing of the injection port are not greatly limited and can be adjusted so that the resin layer can have a wide contact area with the bottom plate or the like, as described above.

An observation hole (for example, 50b in FIG. 4) may be formed at the end of the top plate and the bottom plate, and the like where the injection port is formed. For example, when the resin composition is injected through the injection port, such an observation hole may be for observing whether the injected composition is injected well to the end of the sidewalls, the bottom plate, or the top plate. The position, shape, size, and number of the observation hole are not limited as long as they are formed so that it can be confirmed whether the injected material is properly injected.

The module case may be a thermally conductive case. The term thermally conductive case means a case having the thermal conductivity of the entire case of 10 W/mk or more, or comprising at least a portion having the thermal conductivity as above. For example, at least one of the sidewalls, the bottom plate and the top plate as described above may have the thermal conductivity described above. In another example, at least one of the sidewalls, the bottom plate, and the top plate may comprise a portion having the thermal conductivity.

In the structure of the battery module according to one example, a first filler-containing cured resin layer in contact with the top plate and the battery cell, and a second filler-containing cured resin layer in contact with the bottom plate and the battery cell are included, as described below. In this structure, at least one resin layer of at least the first and second filler-containing cured resin layers may be a thermally conductive resin layer, whereby at least the top plate or the bottom plate in contact with the thermally conductive resin layer may be thermally conductive, or may comprise a thermally conductive portion.

The thermal conductivity of the thermally conductive top plate, bottom plate or side wall; or the thermally conductive portion may be about 20 W/mk or more, 30 W/mk or more, 40 W/mk or more, 50 W/mk or more, 60 W/mk or more, 70 W/mk or more, 80 W/mk or more, 90 W/mk or more, 100 W/mk or more, 110 W/mk or more, 120 W/mk or more, 130 W/mk or more, 140 W/mk or more, 150 W/mk or more, 160 W/mk or more, 170 W/mk or more, 180 W/mk or more, 190 W/mk or more, or about 195 W/mk or more. The higher the value of the thermal conductivity is, the more advantageous it is from the viewpoint of the heat dissipation property of the module, and the like, and the upper limit is not particularly limited. In one example, the thermal conductivity may be about 1,000 W/mk or less, 900 W/mk or less, 800 W/mk or less, 700 W/mk or less, 600 W/mk or less, 500 W/mk or less, 400 W/mk or less, 300 W/mk or less, or about 250 W/mk or less, but is not limited thereto. The kind of materials exhibiting the thermal conductivity as above is not particularly limited, and for example, includes metal materials such as aluminum, gold, pure silver, tungsten, copper, nickel, or platinum. The module case may be comprised entirely of the thermally conductive material as above, or at least a part of the module case may be a portion comprised of the thermally conductive material. Accordingly, the module case may have the above-mentioned range of thermal conductivity, or comprise at least a portion having the aforementioned thermal conductivity.

In the module case, the portion having a thermal conductivity in the above range may be a portion in contact with the resin layer and/or the insulating layer as described below. In addition, the portion having the thermal conductivity may be a portion in contact with a cooling medium such as cooling water. According to this structure, a structure capable of effectively discharging heat generated from the battery cell to the outside can be realized.

The type of the battery cell housed in the module case is not particularly limited, and a variety of known battery cells may be applied. In one example, the battery cell may be a pouch type. Referring to FIG. 5, the pouch type battery cell (100) may typically comprise an electrode assembly, an electrolyte, and a pouch exterior material.

FIG. 5 is an exploded perspective view schematically showing the configuration of an exemplary pouch type cell, and FIG. 6 is a combined perspective view of the configuration of FIG. 5.

The electrode assembly (110) included in the pouch type cell (100) may be in a form in which at least one positive plate and at least one negative plate are disposed with each separator interposed therebetween. The electrode assembly (110) may be a wound type in which one positive plate and one negative plate are wound together with the separator, or a stacked type in which a plurality of positive plates and a plurality of negative plates are laminated alternately with each separator interposed therebetween.

The pouch exterior material (120) may be configured in a form equipped with, for example, an outer insulating layer, a metal layer, and an inner adhesive layer. This exterior material (120) protects internal components such as the electrode assembly (110). The metal layer of the electrode assembly (110) may comprise a metal thin film, such as aluminum, to protect inner elements such as the electrolyte, to complement the electrochemical properties by the electrode assembly (110) and the electrolyte, and to consider heat dissipation or the like. Such a metal thin film may be interposed between insulating layers formed of an insulating material in order to ensure electrical insulation with elements such as the electrode assembly (110) and the electrolyte, or other elements outside the battery (100).

In one example, the exterior material (120) may comprise an upper pouch (121) and a lower pouch (122), where in at least one of the upper pouch (121) and the lower pouch (122), a concave internal space (I) can be formed. The electrode assembly (110) can be housed in the internal space (I) of this pouch. A sealing portion (S) is provided on each outer peripheral surface of the upper pouch (121) and the lower pouch (122) and these sealing portions (S) are bonded to each other so that the internal space accommodating the electrode assembly (110) can be sealed.

Each electrode plate of the electrode assembly (110) is provided with an electrode tab, and one or more electrode tabs may be connected to an electrode lead. The electrode lead may be interposed between the sealing portions (S) of the upper pouch (121) and the lower pouch (122) and exposed to the outside of the exterior material (120) to function as an electrode terminal of the secondary battery (100).

The shape of the pouch type cell as described above is only one example, and the battery cell applied in the present application is not limited to the above-described kind. In the present application, various shapes of known pouch type cells or other types of cells can be all applied as battery cells.

The battery module of the present application may further comprise a resin layer. Specifically, the battery module of the present application may comprise at least a filler-containing cured resin layer. In the present application, the term filler-containing cured resin layer is a layer containing a resin component and a filler. The term cured resin layer means a layer formed by curing a resin composition having a low viscosity to the extent that it is in a liquid phase or has sufficient fluidity. Here, the low viscosity having a liquid phase or sufficient fluidity may mean a range of about 400 cP or less, or about 100 to about 400 cP (based on room temperature and a shear rate of 2.5/s). The viscosity is a result of measurement according to a method of an example to described below. The lower limit of the viscosity is not particularly limited as long as the resin composition has a sufficient low viscosity, but it may be generally about 10Pas or more. In addition, the viscosity is the viscosity of the resin composition before curing.

The battery module may comprise, as the filler-containing cured resin layer, a first filler-containing cured resin layer in contact with the top plate and the battery cell, and a second filler-containing cured resin layer in contact with the bottom plate and the battery cell.

In one example, each of the resin layers may also be an adhesive layer. The term adhesive layer means a case where the adhesive force of the resin layer is at least 150 gf/10 mm or more, 200 gf/10 mm or more, 250 gf/10 mm or more, 300 gf/10 mm or more, 350 gf/10 mm or more, or about 400 gf/10 mm or more. The adhesive force is measured for an aluminum pouch according to a method disclosed in an example to be described below. The upper limit of the adhesive force of the resin layer is not particularly limited, which may be, for example, about 2,000 gf/10 mm or less, 1,500 gf/10 mm or less, 1,000 gf/10 mm or less, 900 gf/10 mm or less, 800 gf/10 mm or less, 700 gf/10 mm or less, 600 gf/10 mm or less, or about 500 gf/10 mm or less or so.

By forming at least two filler-containing cured resin layers in the battery module, a battery module having excellent durability against external impacts or vibrations can be provided.

In the battery module, at least one of the sidewall, the bottom plate and the top plate in contact with the resin layer may be the above-described thermally conductive sidewall, bottom plate or top plate. On the other hand, in this specification, the term contact may also mean a case where, for example, the top plate, the bottom plate and/or the side wall; or the battery cell is in direct contact with the resin layer, or another element, for example, an insulating layer or the like exists therebetween. In addition, the resin layer in contact with the thermally conductive sidewall, bottom plate or top plate may be in thermal contact with the target. At this time, the thermal contact may mean a state that the resin layer is in direct contact with the bottom plate or the like, or other elements, for example, an insulating layer or the like as described below, between the resin layer and the bottom plate or the like are present, but the other element does not interfere with heat transfer from the battery cell to the resin layer, and from the resin layer to the bottom plate or the like. Here, the phrase "does not interfere with heat transfer" means the case that even when other elements (e.g., an insulating layer or a guiding portion as described below) exists between the resin layer and the bottom plate or the like, the total thermal conductivity of the other elements and the resin layer is about 1.5 W/mK or more, about 2 W/mK or more, 2.5 W/mK or more, 3 W/mK or more, 3.5 W/mK or more, or about 4 W/mk or more, or the total thermal conductivity of the resin layer and the bottom plate or the like in contact therewith is included in the range even when the other elements are present. The thermal conductivity of the thermal contact may be about 50 W/mk or less, 45 W/mk or less, 40 W/mk or less, 35 W/mk or less, 30 W/mk or less, 25 W/mk or less, 20 W/mk or less, 15 W/mk or less, 10 W/mk or less, 5 W/mk or less, 4.5 W/mk or less, or about 4.0 W/mk or less. This thermal contact can be achieved by controlling the thermal conductivity and/or the thickness of the other element when the other element is present.

Among the curable resin layers, at least a thermally conductive cured resin layer to be described below may be in thermal contact with the bottom plate or the like and may also be in thermal contact with the battery cell. By adopting such a structure, various fastening parts or cooling equipment of the module, and the like, which was previously required in the construction of a general battery module or a battery pack as an assembly of such modules, is greatly reduced, and simultaneously it is possible to implement a module in which more battery cells are housed per unit volume, while ensuring heat dissipation characteristics. Accordingly, the present application can provide a battery module having high power while being more compact and lighter.

FIG. 7 is an exemplary cross-sectional diagram of the battery module, and for example, the module may be in a form which comprises a case (10) including sidewalls (10b)

and a bottom plate (10a); a plurality of battery cells (20) housed inside the case and a resin layer (30) in contact with both the battery cell (20) and the case (10), as shown in FIG. 7. FIG. 7 is a diagram of the resin layer (30) existing on the side of the bottom plate (10a), but the battery module also comprises a resin layer in the form such as FIG. 7 on the side of the top plate.

The contact area between the resin layer and the bottom plate or the like may be about 70% or more, 75% or more, 80% or more, 85% or more, 90% or more, or about 95% or more, relative to the total area of the bottom plate or the like. The upper limit of the contact area is not particularly limited, and may be, for example, 100% or less, or less than about 100%.

When the top plate or the bottom plate is thermally conductive and the cured resin layer in contact therewith is also thermally conductive, the thermally conductive portion or the thermally conductive bottom plate or the like may be a portion in contact with a cooling medium such as cooling water. That is, as schematically shown in FIG. 7, the heat (H) can be easily discharged to the bottom plate or the like by the above structure, and heat release can be easily performed even in more simplified structures by contacting this bottom plate or the like with the cooling medium (CW).

The first and second cured resin layers may each have a thickness in a range of, for example, about 100 μm to about 5 mm or in a range of about 200 μm to about 5 mm. In the structure of the present application, the thickness of the resin layer may be set to an appropriate thickness in consideration of the desired heat dissipation characteristics or durability. The thickness may be the thickness of the thinnest portion of the resin layer, the thickness of the thickest portion, or the average thickness.

As shown in FIG. 7, a guiding portion (10d) which can guide the housed battery cell (20) may also be present on at least one surface of the inside of the module case (10), for example, a surface (10a) in contact with the resin layer (30). At this time, the shape of the guiding portion (10d) is not particularly limited, and an appropriate shape can be employed in consideration of the shape of the battery cell to be applied, where the guiding portion (10d) may be integrally formed with the bottom plate or the like, or may be attached separately thereto. The guiding portion (10d) may be formed using a thermally conductive material, for example, a metallic material such as aluminum, gold, pure silver, tungsten, copper, nickel, or platinum in consideration of the above-described thermal contact. In addition, although not shown in the drawings, an interleaf or an adhesive layer may also be present between the housed battery cells (20). Here, the interleaf can act as a buffer upon charging and discharging the battery cell.

The resin layer or the battery module, to which the resin layer is applied, may have at least one or more physical properties out of physical properties to be described below. Each physical property to be described below is independent, and any one physical property does not give priority over other physical properties, and the resin layer can satisfy at least one or two or more physical properties as described below.

In one example, at least one of the first and second filler-containing cured resin layers may be a thermally conductive resin layer. In this case, the thermal conductivity of the thermally conductive resin layer may be about 1.5 W/mK or more, 2 W/mK or more, 2.5 W/mK or more, 3 W/mK or more, 3.5 W/mK or more, or about 4 W/mK or more. The thermal conductivity may be about 50 W/mK or less, 45 W/mK or less, 40 W/mK or less, 35 W/mK or less, 30 W/mK or less, 25 W/mK or less, 20 W/mK or less, 15 W/mK or less, 10 W/mK or less, 5 W/mK or less, 4.5 W/mK or less, or about 4.0 W/mK or less. When the resin layer is a thermally conductive resin layer as above, the bottom plate, the top plate and/or the sidewall, and the like to which the resin layer is attached may be a portion having the above-described thermal conductivity of about 10 W/mK or more. At this time, the module case portion representing the thermal conductivity may be a part in contact with a cooling medium, for example, cooling water or the like. The thermal conductivity of the resin layer is, for example, a value measured according to ASTM D5470 standard or ISO 22007-2 standard. The method of setting the thermal conductivity of the resin layer in the above-mentioned range is not particularly limited. For example, the thermal conductivity of the resin layer may be adjusted by using a filler having thermal conductivity as the filler contained in the resin layer.

It is known that among resin components generally known to be usable as adhesives, acrylic resins, urethane resins, and silicone resins have similar heat conduction properties to one another, and epoxy resins have superior thermal conductivity to that of these resins, and olefin resins have higher thermal conductivity than that of the epoxy resins. Therefore, it is possible to select one having excellent thermal conductivity among the resins as needed. However, since the desired thermal conductivity is hardly ensured by only the resin components, it is also possible to apply a method in which filler components having excellent thermal conductivity are contained in the resin layer at an appropriate ratio, as described below.

In the first and second filler-containing cured resin layers included in the battery module, both may be thermally conductive resin layers having the thermal conductivity, and at least one may be the thermally conductive resin layer. In one example, any one of the first and second filler-containing cured resin layers may be the thermally conductive resin layer and the other may be a resin layer having a low thermal conductivity. Such a structure may be advantageous to the heat dissipation characteristic of the battery module.

In this case, the thermal conductivity of the resin layer having a low thermal conductivity may be less than about 1.5 W/mK, 1 W/mK or less, 0.8 W/mK or less, 0.6 W/mK or less, 0.4 W/mK or less, or about 0.2 W/mK or less. Here, the lower limit of the thermal conductivity is not particularly limited, which may be about 0 W/mK or more or more than 0 W/mK.

In the battery module, the resin layer or the battery module, to which the resin layer is applied, may have a thermal resistance of about 5 K/W or less, 4.5 K/W or less, 4 K/W or less, 3.5 K/W or less, 3 K/W or less, or about 2.8 K/W. When the resin layer or the battery module, to which the resin layer is applied, is adjusted in order to exhibit such a range of thermal resistance, excellent cooling efficiency or heat dissipation efficiency can be secured. The method of measuring the thermal resistance is not particularly limited. For example, it can be measured according to ASTM D5470 standard or ISO 22007-2 standard.

After a thermal shock test, for example, a thermal shock test, one cycle of which is composed of holding the battery module at a low temperature of −40° C. for 30 minutes, and then again holding it for 30 minutes after increasing the temperature to 80° C., that the cycle is repeated 100 times, it may be required for the resin layer to be formed such that the resin layer cannot be detached or peeled off from the module case or the battery cell of the battery module or cracks cannot be caused. For example, when the battery module is applied to a product, such as an automobile, requiring a long guarantee period (for example, about 15 years or more in the case of the automobile), performance may be required in the same level as above to ensure durability.

The first and second filler-containing cured resin layers may be electrically insulating resin layers. In the structure described above, by exhibiting electrical insulation, the resin layer can maintain the performance of the battery module and secure stability. The electrically insulating resin layer may have an insulation breakdown voltage, as measured according to ASTM D149, of about 3 kV/mm or more, 5 kV/mm or more, 7 kV/mm or more, 10 kV/mm or more, 15 kV/mm or more, or about 20 kV/mm or more. The higher the value of the insulation breakdown voltage is, the resin layer shows more excellent insulation, and thus the voltage is not particularly limited, but may be about 50 kV/mm or less, 45 kV/mm or less, 40 kV/mm or less, 35 kV/mm or less, or about 30 kV/mm or less in consideration of composition of the resin layer or the like. The insulation breakdown voltage as above may also be controlled by controlling the insulating property of the resin component in the resin layer, and for example, the insulation breakdown voltage can be controlled by applying insulating fillers in the resin layer. In general, among the thermally conductive fillers, ceramic fillers as described below are known as a component capable of ensuring insulation.

As the first and second filler-containing cured resin layers, a flame retardant resin layer can be applied in consideration of stability. The term flame retardant resin layer in the present application may mean a resin layer showing a V-0 rating in UL 94 V Test (Vertical Burning Test). This can secure stability against fires and other accidents that may occur in the battery module.

The first and second filler-containing cured resin layers may have a specific gravity of 5 or less. In another example, the specific gravity may be about 4.5 or less, 4 or less, 3.5 or less, or about 3 or less. The resin layer showing the specific gravity in this range is advantageous for manufacturing a lightweight battery module. The lower the value of the specific gravity is, the more advantageous the lightening of the module is, and thus the lower limit is not particularly limited. For example, the specific gravity can be about 1.5 or more, or about 2 or more. The components added to the resin layer can be adjusted so that the resin layer exhibits the specific gravity in the above range. For example, when the fillers are added, a method of applying fillers capable of securing a desired thermal conductivity even at a low specific gravity, if possible, that is, fillers having a low specific gravity or surface-treated fillers, and the like may be used.

It is appropriate that the first and second filler-containing cured resin layers do not contain volatile substances, if possible. For example, the resin layer may have a ratio of non-volatile components of about 90 wt % or more, 95 wt % or more, or about 98 wt % or more. Here, the non-volatile components and the ratio thereof can be specified in the following manner. That is, the non-volatile content can be defined as the remaining portion after the resin layer is maintained at 100° C. for about 1 hour, and thus the ratio can be measured based on the initial weight of the resin layer and the ratio after the resin layer is maintained at 100° C. for about 1 hour.

The first and second filler-containing cured resin layers may have excellent resistance to deterioration, if necessary, but it may be required to have stability that the surface of the module case or the battery cell is chemically unreactive, if possible.

It may be advantageous that the first and second filler-containing cured resin layers have also a low shrinkage ratio during the process of curing or after curing. This can prevent the occurrence of peeling or voids that may occur during the manufacture or use process of the module. The shrinkage ratio can be appropriately adjusted within a range capable of exhibiting the above-mentioned effect, and can be, for example, less than 5%, less than 3% or less than about 1%. The lower the value of the shrinkage ratio is, the more advantageous the shrinkage ratio is, and thus the lower limit is not particularly limited.

It may be advantageous that the first and second filler-containing cured resin layers have also a low coefficient of thermal expansion (CTE). This can prevent the occurrence of peeling or voids that may occur during the manufacture or use process of the module. The coefficient of thermal expansion can be appropriately adjusted within a range capable of exhibiting the above-described effects, and can be, for example, less than about 300 ppm/K, less than 250 ppm/K, less than 200 ppm/K, less than 150 ppm/K or less than about 100 ppm/K. The lower the value of the coefficient of thermal expansion is, the more advantageous the coefficient is, and thus the lower limit is not particularly limited.

The tensile strength of the first and second filler-containing cured resin layers can be appropriately adjusted, whereby excellent impact resistance and the like can be secured to provide a module showing appropriate durability. The tensile strength can be adjusted, for example, in the range of about 1.0 MPa or more.

The elongation of the first and second filler-containing cured resin layers can be appropriately adjusted, whereby excellent impact resistance and the like can be secured to provide a module showing appropriate durability. The elongation can be adjusted, for example, in the range of about 10% or more, or about 15% or more.

It may be advantageous that the first and second filler-containing cured resin layers also exhibit an appropriate hardness. For example, if the hardness of the resin layer is too high, the resin layer becomes excessively brittle, which may adversely affect reliability. Also, by controlling the hardness of the resin layer, the impact resistance and the vibration resistance can be secured, and the durability of the product can be ensured. The resin layer may have, for example, a hardness in Shore A type of less than about 100, 99 or less, 98 or less, 95 or less, or about 93 or less, or a hardness in Shore D type of less than about 80, 70 or less, about 65 or less, or about 60 or less. The lower limit of the hardness is not particularly limited. For example, the hardness in Shore A type may be 60 or more, or the hardness in Shore D type may be about 5 or more, or about 10 or more. The hardness of the resin layer usually depends on the type and the ratio of the fillers contained in the resin layer, and when an excessive amount of fillers is included, the hardness is usually increased. However, the resin component included in the resin layer also affects the hardness, as the silicone resins usually show a lower hardness than other resins such as epoxy or urethane.

The first and second filler-containing cured resin layers may also have a 5% weight loss temperature in a thermogravimetric analysis (TGA) of 400° C. or more, or an 800° C. balance may be 70 wt % or more. By such a characteristic, the battery module can have more improved stability at high temperature. In another example, the 800° C. balance may be about 75 wt % or more, 80 wt % or more, 85 wt % or more, or about 90 wt % or more. In another example, the 800° C. balance may be about 99 wt % or less. The thermogravimetric analysis (TGA) can be conducted within a range of 25° C. to 800° C. at a temperature raising rate of 20° C./minute under a nitrogen ($N_2$) atmosphere of 60 $cm^3$/minute. The thermogravimetric analysis (TGA) results can also be achieved by controlling the composition of the resin layer. For example, the 800° C. balance usually depends on the type or ratio of the fillers contained in the resin layer, and when an excess amount of the fillers is contained, the balance increases. However, since the silicone resins generally have higher heat resistance than other resins such as epoxy or urethane, the balance is higher, whereby the resin component included in the resin layer also affects the hardness.

In one example, the battery module may further comprise an insulating layer between the module case and the battery cell or between the resin layer and the module case. FIG. 8 is an example in which the insulating layer (40) is formed between the resin layer (30) and the guiding portion (10*d*) formed on the bottom plate (10*a*) of the case. By adding an insulating layer, it is possible to prevent problems such as an electrical short phenomenon or a fire due to a contact between the cell and the case by an impact that may occur during use. The insulating layer may be formed using an insulating sheet having high insulation and thermal conductivity, or may be formed by applying or injecting a material exhibiting insulating properties. For example, in a method for manufacturing a battery module as described below, a process of forming an insulating layer may be performed before the injection of the resin composition. A so-called TIM (thermal interface material) or the like may be applied in forming the insulating layer. Alternatively, the insulating layer may be formed of an adhesive material, and for example, the insulating layer may also be formed using a resin layer having little or no filler such as thermally conductive fillers. As the resin component which can be used for forming the insulating layer, an acrylic resin, PVC (poly(vinyl chloride)), an olefin resin such as PE (polyethylene), an epoxy resin, silicone or a rubber component such as an EPDM (ethylene propylene diene monomer) rubber, and the like can be exemplified, without being limited thereto. The insulating layer may have an insulation breakdown voltage, as measured according to ASTM D149, of about 5 kV/mm or more, 10 kV/mm or more, 15 kV/mm or more, 20 kV/mm or more, 25 kV/mm or more, or about 30 kV/mm or more. The higher the value of the insulation breakdown voltage is, the better the insulation shows, and thus it is not particularly limited. For example, the insulation breakdown voltage of the insulating layer may be about 100 kV/mm or less, 90 kV/mm or less, 80 kV/mm or less, 70 kV/mm or less, or about 60 kV/mm or less. The thickness of the insulating layer can be set to an appropriate range in consideration of the insulating property and the thermal conductivity of the insulating layer, and the like, and for example, may be about 5 μm or more, 10 μm or more, 20 μm or more, 30 μm or more, 40 μm or more, 50 μm or more, 60 μm or more, 70 μm or more, 80 μm or more, or about 90 μm or more or so. In addition, the upper limit of the thickness is not particularly limited and may be, for example, about 1 mm or less, about 200 μm or less, 190 μm or less, 180 μm or less, 170 μm or less, 160 μm or less, or 150 μm or less.

An exemplary aspect of the present application relates to a method for manufacturing a battery module in such a form. That is, the exemplary manufacturing method may be a method for manufacturing a battery module which comprises a module case, in which an internal space is formed by a bottom plate and sidewalls, and an injection port is formed in the bottom plate or the sidewalls; a plurality of battery cells existing in the internal space; and a resin layer in contact with the bottom plate or the sidewalls while being in contact with the battery cells.

In the manufacturing method, the specific structure of the case, the material and the shape thereof, and the details of the battery cell and the resin layer are the same as already described. However, the battery module is one example of modules that can be manufactured by the manufacturing method of the present application, and the manufacturing method of the present application can also be applied to the formation of other modules requiring a similar injection process in the manufacturing processes, in addition to the above-described module.

The manufacturing method of the present application comprises a process of attaching a tape to the injection port before injecting the resin composition through the injection port. That is, the manufacturing method may comprise a step of attaching a tape to cover the injection port of the bottom plate or the sidewalls. FIG. 9 is a schematic diagram of the bottom plate (100*a*) or sidewalls in which the tape (600) is attached to cover the injection port (500).

In the manufacturing method of the present application, an injection device for injecting a resin composition is mounted on the injection port, following the above steps. In this process, the injection device may be mounted such that the injection device is mounted on the injection port while penetrating the tape. Such a process is schematically shown in FIG. 10, where the process can be performed by advancing the injection device (700) toward the tape (600) covering the injection port of the bottom plate (100*a*) or the like as in FIG. 10, and as a result, as shown in FIG. 11, while the tape is torn, the injection device can be mounted on the injection port by penetrating the tape.

The type of the injection apparatus to be applied in this process is not particularly limited, and a nozzle or other devices capable of injecting the resin composition may be used.

In the manufacturing method of the present application, after mounting such an injection device, the resin composition may be injected into the relevant injection device.

The above-described reverse discharge phenomenon can be prevented by this method, or even if the reverse discharge is caused, it is possible to simply and cleanly remove the material that has been discharged reversely by removing the tape after removal of the injection device.

In the manufacturing method of the present application, the type of the tape attached to the injection port is not particularly limited, and a suitable type may be used. For example, the tape may include paper, a polyester-based polymer film such as polyethylene terephthalate or polyethylene naphthalate, a cellulose-based polymer film such as diacetylcellulose or triacetylcellulose, an acrylic polymer film such as polymethylmethacrylate, a styrene-based polymer film such as polystyrene or an acrylonitrile/styrene copolymer (AS resin), a polycarbonate polymer film or the like. Also, a polyolefin-based polymer film such as polyethylene, polypropylene, polyolefin having a cyclo- or norbornene-based structure or an ethylene/propylene copolymer, a vinyl chloride-based polymer film, an amide-based polymer film such as nylon or aromatic polyamide, an imide-based polymer film, a sulfone-based polymer film, a polyethersulfone-based polymer film, a polyetheretherketone-based polymer film, a polyphenylenesulfide-based polymer film, a vinylalcohol-based polymer film, a vinylidene chloride-based polymer film, a vinylbutyralbased polymer film, an allylate-based polymer film, a polyoxymethylene-based polymer film, an epoxy-based polymer film, or a film of a blend of the above polymers or the like can be used. The attachment step can be performed by forming a known pressure-sensitive adhesive layer on one surface of such a tape. Furthermore, the thickness of the film is not particularly limited, and an appropriate thickness may be selected according to the purpose.

In the method of the present invention, a penetrating auxiliary portion with a smaller size than that of the injection port may be formed on the tape attached to cover the injection port may have, and in another example, a step of attaching the tape to the injection port and then forming the penetrating auxiliary portion may also be further performed.

FIG. 12 is an example of the case where the penetrating auxiliary portion (800) is formed, where this penetrating auxiliary portion can be performed in a known manner such as a method of making a cut on a tape.

The injection device can be mounted in the tape, while effectively penetrating the tape, by forming such an auxiliary portion and then mounting the injection device toward the auxiliary portion.

In the manufacturing method of the present application, a series of processes, such as attachment of the tape, installation of the injection device and injection of the resin composition, may also be performed in a state where the battery cells are present in the internal space of the module case, and may also be performed in a state where they are not present, but generally, it can be performed in a state where a number of battery cells are present in the internal space.

In the manufacturing method of the present application, following the injection process, a process of removing the tape that has been attached may be further performed.

In addition, any necessary process may be further performed, and for example, in the case where the injected resin composition is a curable resin, a process of curing the relevant resin composition may be performed, and as described above, in order to form a structure in which the first and second resin layers are simultaneously applied, the above process may be performed through the injection port of the bottom plate and the same process may also be repeatedly performed through the injection port of the top plate.

The type of the resin composition to be injected in the above process is not particularly limited, and any kind may be used as long as it is formulated so as to be capable of forming the resin layer as described above. For example, the resin composition may comprise an acrylic resin, an epoxy resin, a urethane resin, an olefin resin, a urethane resin, an EVA (ethylene vinyl acetate) resin or a silicone resin, or a precursor thereof.

The resin composition may be an adhesive material as described above, and may be a solvent type, a water-based type or a solventless type, but the solventless type resin layer may be appropriate in consideration of convenience of the manufacturing process to be described below, and the like.

The resin layer material may be an active energy beam curing type, a moisture curing type, a thermosetting type, a room temperature curing type, or the like, and the room temperature curing type may also be appropriate in consideration of the convenience of the manufacturing process to be described below, and the like.

In one example, the resin composition may be a curable resin composition. For example, for manufacturing the battery module having the above-described structure, the curable resin composition is required to have the following physical properties. First, if necessary, in order to secure thixotropy or thermal conductivity, a large amount of fillers may be contained in the resin composition, and in this case, in order to secure injection processability or the like, it is necessary for the resin composition to exhibit the sufficiently low viscosity as described above. In addition, if only the low viscosity is simply shown, it is also difficult to ensure processability, so that appropriate thixotropy is required, and it may be necessary that the curing itself progresses at room temperature while exhibiting excellent adhesive force by curing.

In the present application, a urethane resin composition may be applied as the resin composition securing such characteristics. That is, the resin layer may be a urethane resin layer, that is, a resin layer containing a urethane resin as a main component in resin components.

The urethane resin composition may be a two-component type comprising a main composition part containing at least a polyol or the like; and a curing agent composition part containing at least an isocyanate compound, and the resin layer may be formed by compounding such a two-component type to prepare a resin composition and curing the composition.

For example, a known mixer such as a static mixer may be applied to mix the main composition part with the curing agent composition, and then the mixture may be injected through the injection device.

Therefore, the urethane resin layer may comprise at least the polyol-derived unit and the polyisocyanate-derived unit. In this case, the polyol-derived unit may be a unit formed by urethane-reacting the polyol with the polyisocyanate, and the polyisocyanate-derived unit may be a unit formed by urethane-reacting the polyisocyanate with the polyol.

As the urethane resin composition, a resin composition containing at least a polyol which is amorphous or has low crystallinity as the polyol contained in the main composition may be applied for securing the physical properties.

Here, the term amorphous means a case where a crystallization temperature (Tc) and a melting temperature (Tm) are not observed in a DSC (differential scanning calorimetry) analysis, and at this time, the DSC analysis can be performed in a range of −80° C. to 60° C. at a rate of 10° C./minute, which can be measured, for example, by a method of raising the temperature from 25° C. to 60° C. at the above rate, lowering it to −80° C. again and raising it to 60° C. again. Furthermore, the sufficiently low crystallinity herein means a case where the melting point (Tm) observed in the DSC analysis is about 20° C. or lower, about 15° C. or lower, 10° C. or lower, 5° C. or lower, 0° C. or lower, −5° C. or lower, −10° C. or lower, or about −20° C. or lower. The lower limit of the melting point is not particularly limited, and for example, the melting point may be about −80° C. or higher, −75° C. or higher, or about −70° C. or higher.

As the polyol as above, an ester-based polyol to be described below can be exemplified. That is, among the ester-based polyols, a carboxylic acid-based polyol or a caprolactone-based polyol, specifically polyol having a structure to be described below, effectively satisfies the above-mentioned characteristics.

Generally, the carboxylic acid-based polyol is formed by a urethane reaction of a component comprising dicarboxylic acid and polyol (e.g. diol or triol), and the caprolactone-based polyol is formed by reacting caprolactone and polyol (e.g. diol or triol), where the polyol satisfying the above-described physical properties can be constituted through control of the kind and ratio of each component.

In one example, the polyol may be polyol represented by Formula 1 or 2 below.

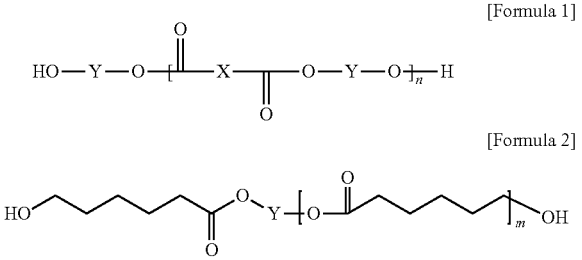

[Formula 1]

[Formula 2]

In Formulas 1 and 2, X is a dicarboxylic acid-derived unit, Y is a polyol-derived unit, for example, a triol or diol unit, and n and m are integers.

Here, the dicarboxylic acid-derived unit is a unit formed by a urethane reaction of dicarboxylic acid with polyol, and the polyol-derived unit is a unit formed by a urethane reaction of polyol with dicarboxylic acid or caprolactone.

That is, when a hydroxyl group of the polyol and a carboxyl group of the dicarboxylic acid are reacted, a water ($H_2O$) molecule is desorbed by a condensation reaction to form an ester bond, where after the dicarboxylic acid forms the ester bond by the condensation reaction, X in Formula 1 above means a moiety excluding the ester bond moiety, and after the polyol also forms the ester bond by the condensation reaction, Y is a moiety excluding the ester bond, and the ester bond is represented in Formula 1.

In addition, after the polyol forms an ester bond with caprolactone, Y in Formula 2 also represents a moiety excluding the ester bond.

On the other hand, when the polyol-derived unit of Y herein is a unit derived from polyol containing three or more hydroxyl groups such as a triol unit, a structure in which the Y moiety is branched in the structure of the above formula may be realized.

The kind of the dicarboxylic acid-derived unit of X in Formula 1 above is not particularly limited, but it may be any one unit selected from the group consisting of a phthalic acid unit, an isophthalic acid-derived unit, a terephthalic acid-derived unit, a trimellitic acid-derived unit, a tetrahydrophthalic acid-derived unit, a hexahydrophthalic acid-derived unit, a tetrachlorophthalic acid-derived unit, an oxalic acid-derived unit, an adipic acid-derived unit, an azelaic acid-derived unit, a sebacic acid-derived unit, a succinic acid-derived unit, a malic acid-derived unit, a glutaric acid-derived unit, a malonic acid-derived unit, a pimelic acid-derived unit, a suberic acid-derived unit, a 2,2-dimethylsuccinic acid-derived unit, a 3,3-dimethylglutaric acid-derived unit, a 2,2-dimethylglutaric acid-derived unit, a maleic acid-derived unit, a fumaric acid-derived unit, an itaconic acid-derived unit and a fatty acid-derived unit for securing units and desired physical properties, and an aliphatic dicarboxylic acid-derived unit is more advantageous than an aromatic dicarboxylic acid-derived unit in consideration of the glass transition temperature of the cured resin layer.

On the other hand, in Formulas 1 and 2, the kind of the polyol-derived unit of Y is not particularly limited, but it may be any one or two or more selected from the group consisting of an ethylene glycol-derived unit, a propylene glycol-derived unit, a 1,2-butylene glycol-derived unit, a 2,3-butylene glycol-derived unit, a 1,3-propanediol-derived unit, a 1,3-butanediol-derived unit, a 1,4-butanediol-derived unit, a 1,6-hexanediol-derived unit, a neopentyl glycol-derived unit, a 1,2-ethylhexyldiol-derived unit, a 1,5-pentanediol-derived unit, a 1,10-decanediol-derived unit, a 1,3-cyclohexanedimethanol-derived unit, a 1,4-cyclohexanedimethanol-derived unit, a glycerin-derived unit and a trimethylol propane-derived unit for securing units and desired physical properties.

On the other hand, in Formula 1 above, n is an integer, and the range may be selected in consideration of desired physical properties, and may be, for example, about 2 to 10 or 2 to 5.

Also, in Formula 2 above, m is an integer, and the range may be selected in consideration of desired physical properties, and may be, for example, about 1 to 10 or 1 to 5.

When n and m in Formulas 1 and 2 are excessively large, the crystallinity of the polyol can be strongly expressed.

The molecular weight of this polyol may be adjusted in consideration of desired low viscosity characteristics, durability or adhesiveness, and the like, which may be, for example, in a range of about 300 to 2,000. The molecular weight mentioned in this specification may be, for example, a weight average molecular weight measured by using GPC (gel permeation chromatograph), and unless otherwise specified herein, the molecular weight of a polymer means a weight average molecular weight.

The kind of the polyisocyanate contained in the curing agent composition part of the urethane resin composition is not particularly limited, but it may be advantageous that it is an alicyclic series in order to secure desired physical properties.

That is, the polyisocyanate may be an aromatic polyisocyanate compound such as tolylene diisocyanate, diphenylmethane diisocyanate, phenylenediisocyanate, polyethylenephenylene polyisocyanate, xylene diisocyanate, tetramethylxylylene diisocyanate, trizine diisocyanate, naphthalene diisocyanate and triphenylmethane triisocyanate; an aliphatic polyisocyanate such as hexamethylene diisocyanate, trimethylhexamethylene diisocyanate, lysine diisocyanate, norbornane diisocyanate methyl, ethylene diisocyanate, propylene diisocyanate or tetramethylene diisocyanate; an alicyclic polyisocyanate such as transcyclohexane-1,4-diisocyanate, isoboron diisocyanate, bis (isocyanate methyl)cyclohexane diisocyanate or dicyclohexylmethane diisocyanate; or a carbodiimide-modified polyisocyanate or an isocyanurate-modified polyisocyanate of any one or two or more of the foregoing, and the like can be used, but the application of polyisocyanates other than aromatics is appropriate.

The ratio of the polyol to the polyisocyanate in the resin composition is not particularly limited and is appropriately controlled so as to enable the urethane reaction thereof.

In order to incorporate other components, such as a filler and a flame retardant to be described below, into the resin layer, desired additives may be compounded to the main composition part and/or the curing agent composition part of the resin composition and cured.

Thus, the resin composition may comprise a filler in consideration of thermal conductivity, insulation, heat resistance (TGA analysis) or specific gravity, and the like as described above. If necessary, through use of an appropriate filler, the thermal conductivity in the above-mentioned range or the like can be secured. In one example, the filler included in at least the thermally conductive filler-containing cured resin layer may be a thermally conductive filler. In the present application, the term thermally conductive filler means a material having thermal conductivity of about 1 W/mK or more, 5 W/mK or more, 10 W/mK or more, or about 15 W/mK or more. The thermal conductivity of the thermally conductive filler may be about 400 W/mK or less, 350 W/mK or less, or about 300 W/mK or less. The kind of the usable thermally conductive filler is not particularly limited, but a ceramic filler may be applied in consideration of the insulating property and the like. For example, ceramic particles such as alumina, AlN (aluminum nitride), BN (boron nitride), silicon nitride, SiC or BeO may be used. In addition, if the insulating properties of the resin layer can be ensured, application of a carbon filler such as graphite may also be considered. The shape or ratio of the filler contained in the resin composition is not particularly limited, which may be selected in consideration of viscosity of the resin composition, possibility of settling in the resin layer, the desired heat resistance or thermal conductivity, insulation, a filling effect or dispersion, and the like. Generally, the larger the size of the filler, the higher the viscosity of the resin composition and the higher the possibility that the filler precipitates in the resin layer. Furthermore, the smaller the size, the thermal resistance tends to be increased. Therefore, an appropriate type of filler may be selected in consideration of the above points, and two or more fillers may also be used, if necessary. Considering the filling amount, it is advantageous to use a spherical filler, but considering network formation or conductivity, a filler in a form such as needle-like morphology or flattened morphology may also be used. In one example, the resin layer may comprise a thermally conductive filler having an average particle diameter in a range of about 0.001 μm to about 80 μm. In another example, the average particle diameter of the filler may be about 0.01 μm or more, 0.1 or more, 0.5 μm or more, 1 μm or more, 2 μm or more, 3 μm or more, 4 μm or more, 5 μm or more, or about 6 μm or more. In another example, the average particle diameter of the filler may be about 75 μm or less, 70 μm or less, 65 μm or less, 60 μm or less, 55 μm or less, 50 μm or less, 45 μm or less, 40 μm or less, 35 μm or less, 30 μm or less, 25 μm or less, 20 μm or less, 15 μm or less, 10 μm or less, or 5 μm or less.

The ratio of the filler contained in the thermally conductive resin layer or resin composition can be selected in consideration of the characteristics of the resin layer so that the above-mentioned characteristics, for example, thermal conductivity, insulation, and the like can be secured. For example, the filler may be contained in a range of about 50 to about 2,000 parts by weight relative to 100 parts by weight of the resin component or the precursor in the resin layer or the resin composition. In another example, the part by weight of the filler may be about 100 parts by weight or more, about 150 parts by weight or more, 200 parts by weight or more, 250 parts by weight or more, 300 parts by weight or more, 350 parts by weight or more, 400 parts by weight or more, 500 parts by weight or more, 550 parts by weight or more, 600 parts by weight or more, or about 650 parts by weight or more.

Therefore, the ratio of the filler in the resin composition can be adjusted according to the above details.

The filler-containing cured resin layer that is not thermally conductive may also comprise a filler depending on the purpose, for example, for securing thixotropy. In this case, the filler need not be thermally conductive, and the ratio thereof is not required to be particularly large, as long as adequate thixotropy is ensured.

The type of the filler included in this resin layer is not particularly limited, but may be, for example, fumed silica, clay or calcium carbonate, and the like. Of course, if necessary, the resin layer or the resin composition may also comprise a small amount of a suitable kind among the above-mentioned thermally conductive fillers. The shape or ratio of the filler is not particularly limited, which may be selected in consideration of the viscosity of the resin composition, the sedimentation possibility in the resin layer, the thixotropy, the insulating property, the filling effect or the dispersibility, and the like. As described above, a suitable type of filler can be selected in consideration of the viscosity of the resin composition, the sedimentation possibility of the filler or thermal resistance, and the like, and two or more kinds of fillers may also be used, if necessary. In one example, the average particle diameter of the filler contained in the resin layer may be in a range of about 0.001 μm to about 80 μm. In another example, the average particle diameter of the filler may be about 0.01 μm or more, 0.1 or more, 0.5 μm or more, 1 μm or more, 2 μm or more, 3 μm or more, 4 μm or more, 5 μm or more, or about 6 μm or more. In another example, the average particle diameter of the filler may be about 75 μm or less, 70 μm or less, 65 μm or less, 60 μm or less, 55 μm or less, 50 μm or less, 45 μm or less, 40 μm or less, 35 μm or less, 30 μm or less, 25 μm or less, 20 μm or less, 15 μm or less, 10 μm or less, or about 5 μm or less.

The ratio of the filler contained in the resin layer or the resin composition having low thermal conductivity can be selected in consideration of the desired thixotropy and the like. For example, the filler may be contained in a range of about 100 to about 300 parts by weight relative to 100 parts by weight of the resin component of the resin layer or the resin composition.

The resin layer or the resin composition may further comprise a viscosity controlling agent, such as a thixotropic agent, a diluent, a dispersant, a surface treatment agent or a coupling agent, for adjusting viscosity, if necessary, for example, for raising or lowering viscosity or for controlling viscosity depending on shear force.

The thixotropic agent controls the viscosity of the resin composition depending on the shear force, whereby the process of manufacturing the battery module can be effectively performed. As the usable thixotropic agent, fumed silica and the like can be exemplified.

The diluent or dispersant is usually used for lowering the viscosity of the resin composition, and any of various kinds known in the art can be used without limitation as long as it can exhibit the above action.

The surface treatment agent is for surface treatment of the filler introduced into the resin layer, and any of various kinds known in the art can be used without limitation as long as it can exhibit the above action.

The coupling agent may be used, for example, to improve the dispersibility of the thermally conductive filler such as alumina, and any of various kinds known in the art may be used without limitation as long as it can exhibit the above action.

The resin layer or the resin composition may further comprise a flame retardant or a flame retardant aid agent, and the like. Such a resin layer or resin composition can form a flame retardant resin layer. As the flame retardant, various known flame retardants can be applied without particular limitation, and for example, solid filler type flame retardants and liquid flame retardants can be applied. The flame retardant includes, for example, organic flame retardants such as melamine cyanurate and inorganic flame retardants such as magnesium hydroxide, but is not limited thereto.

When the amount of the filler filled in the resin layer or the resin composition is large, a liquid type flame retardant material (TEP, triethyl phosphate, or TCPP, tris(1,3-chloro- 2-propyl)phosphate, etc.) may also be used. In addition, a silane coupling agent capable of acting as a flame retardant synergist may also be added.

Advantageous Effects

The present application can provide a method for manufacturing a battery module by a simple process and at low cost without occurrence of a reverse discharge phenomenon.

Mode for Invention

Hereinafter, the battery module of the present application will be described through examples and comparative examples, but the scope of the present application is not limited by the scope as set forth below.

1. Viscosity of Resin Composition

The viscosity of the resin composition was measured at room temperature and a shear rate condition of from 0.01 to 10.0/s using a rheological property measuring machine (ARES). The viscosity mentioned in the examples is a viscosity at a point of a shear rate of 2.5/s, where a TI (thixotropic index) can be determined through a ratio of a viscosity at a point of a shear rate of 1.0/s to a viscosity at a point of a shear rate of 10.0/s.

EXAMPLE 1

Preparation of Resin Composition

As a resin composition, two-component urethane adhesive composition was used. A main composition (viscosity: about 350,000 to 400,000 cP, based on room temperature and a shear rate of 2.5/s) comprising, as a caprolactone polyol represented by Formula 2 above, a polyol, wherein the number of repeating units (m in Formula 2) is in a level of about 1 to 3 or so and as the polyol-derived unit (Y in Formula 2), ethylene glycol and propylene glycol units are included, was used as the main composition, and a composition comprising polyisocyanate (HDI, hexamethylene diisocyanate) was used as the curing agent composition (viscosity: about 270,000 to 300,000 cP, based on room temperature and a shear rate of 2.5/s). In order to ensure thixotropy, calcium carbonate as a filler was divided and compounded in the same amount into the main and curing agent compositions so that the weight ratio was about 280 parts by weight or so relative to 100 parts by weight of the total solid content of the main and curing agent compositions. For the formation of the resin layer, the main and curing agent compositions were compounded while adjusting their equivalents and used. The viscosity of each of the main and curing agent compositions described in examples is the viscosity in a state where the filler is compounded.

Manufacture of Battery Module

As a module case having the same shape as FIG. 2, a module case having a bottom plate, sidewalls, and a top plate, made of aluminum, was used. Guiding portions for guiding installation of battery cells were formed on the internal surface of the bottom plate in the module case, injection ports (50a) for injecting the resin composition were formed at regular intervals in the central part of the bottom plate in the module case, and observation holes (50b) were formed at the end, as shown in FIG. 4. A bundle of pouches laminating a plurality of battery pouches was housed in the module case. Subsequently, the top plate was covered on the upper surface of the module case. Thereafter, as shown in FIG. 9, a tape (600) was attached so as to cover the injection port (500) of the bottom plate (100a), and a small cut was made at the center thereof to form an auxiliary portion as shown in FIG. 12. Here, as the tape (600), a tape, in which an acrylic pressure-sensitive adhesive was formed on one side of a PET (poly(ethylene terephthalate)) film having a thickness of about 30 μm to about 50 μm or so, was used.

Subsequently, the injection nozzle was moved toward the cut portion of the tape in the manner shown in FIG. 10 and mounted in the form shown in FIG. 11, and then the resin composition was injected. The injection was performed until it was confirmed that the resin composition to be injected reached the observation holes. After the injection was completed, the injection device was removed and then the tape was also removed.

As a result, there was no component of the resin composition which was reversely discharged to the injection port portion, and this series of processes took place in less than 20 seconds.

COMPARATIVE EXAMPLE 1

A battery module was manufactured in the same manner as in Example 1, except that the tape was not attached and the resin composition was injected using the injection device directly. As a result, the reverse discharge phenomenon as shown in FIG. 1 was observed. Here, in the process of removing the reversely discharged resin composition with a solvent, the surface of the case was scratched by the filler in the resin composition, and thus a phenomenon that the case surface was changed to black was observed, and the time for the removal took 20 minutes or more.

COMPARATIVE EXAMPLE 2

A tape was attached in the same manner as in Example 1, but a hole was previously perforated in the tape in accordance with the shape of the injection port and the tape was attached so that the perforated hole matched the injection port. That is, in the above example, the tape was not covered with the injection port. In this way, the resin composition still remained around the injection port was also observed, and in the process of removing the resin composition, the surface of the case was also scratched by the filler in the resin composition, and thus a phenomenon that the case surface was changed to black was observed. In addition, the amount of the residual resin composition was smaller than that of Comparative Example 1, so that the time for removal was shortened, but it also took about 10 minutes.

The invention claimed is:

1. A method for manufacturing a battery module, comprising steps of:
attaching a tape to cover an injection port of a module case, the module case having an internal space formed by a top plate, a bottom plate and sidewalls of the module case, wherein a plurality of battery cells are disposed in the internal space, and wherein the injection port is formed in the bottom plate or the sidewalls;
mounting an injection device on the injection port such that the injection device penetrates the tape; and
injecting a resin composition through the injection device into the internal space to form a resin layer; and
removing the tape after the resin composition has been injected,
wherein the resin layer is in contact with the plurality of battery cells, and with the bottom plate or the sidewalls,
wherein the resin composition is a curing resin composition.

2. The method for manufacturing a battery module according to claim 1, wherein the injection port is formed along a total length of the sidewalls or the bottom plate at a point that is 1/4 to 3/4 along the total length from an end of the sidewalls or the bottom plate.

3. The method for manufacturing a battery module according to claim 1, wherein the tape comprises a polyester film, an acrylic film, a polyolefin film, paper, a cellulose-based polymer film, a polystyrene film or a polycarbonate-based film.

4. The method for manufacturing a battery module according to claim 1, further comprising:
prior to attaching the tape, forming a penetrating auxiliary portion in the tape, the penetrating auxiliary portion having a smaller size than that of the injection port; or
forming the penetrating auxiliary portion after the tape is attached to cover the injection portion.

5. The method for manufacturing a battery module according to claim 4, wherein the injection device is mounted on the injection port toward the penetrating auxiliary portion.

6. The method for manufacturing a battery module according to claim 1, wherein the injection of the resin composition is performed in a state where the plurality of battery cells are present in the internal space.

7. The method for manufacturing a battery module according to claim 1, wherein the resin composition to be injected has a room temperature viscosity of 400 cP or less at a shear rate of 2.5/s.

8. The method for manufacturing a battery module according to claim 1, wherein the resin composition is a room temperature curing resin composition.

9. The method for manufacturing a battery module according to claim 1, wherein the resin composition comprises:
a resin component comprising an acrylic resin, an epoxy resin, a urethane resin, an olefin resin, an EVA resin, a silicone resin, or precursors thereof.

10. The method for manufacturing a battery module according to claim 9, wherein the resin composition further comprises a filler.

11. The method for manufacturing a battery module according to claim 10, wherein the filler is present in a range of 50 to 2,000 parts by weight relative to 100 parts by weight of the resin component or the one or more precursors.

* * * * *